(12) United States Patent
Goyins et al.

(10) Patent No.: US 8,533,389 B1
(45) Date of Patent: Sep. 10, 2013

(54) MULTI-CLIENT CONTENT ADDRESSABLE MEMORY ACCESS CONTROL METHOD

(75) Inventors: Gregg Goyins, Lincoln, CA (US); Jonathan Bradley Sadowsky, West Sacramento, CA (US)

(73) Assignee: PMC-Sierra, Inc., Sunnyvale, CA (US)

( * ) Notice: Subject to any disclaimer, the term of this patent is extended or adjusted under 35 U.S.C. 154(b) by 1019 days.

(21) Appl. No.: 12/559,951

(22) Filed: Sep. 15, 2009

Related U.S. Application Data

(60) Provisional application No. 61/097,025, filed on Sep. 15, 2008.

(51) Int. Cl.
*G06F 12/00* (2006.01)
(52) U.S. Cl.
USPC .................. 711/108; 711/118; 711/E12.044; 711/E12.05
(58) Field of Classification Search
USPC .................................................. 711/108, 118
See application file for complete search history.

(56) References Cited

U.S. PATENT DOCUMENTS

| 7,194,573 B1* | 3/2007 | Saxtorph et al. ............... 711/108 |
| 2007/0174556 A1* | 7/2007 | Brown et al. .................. 711/141 |
| 2008/0031040 A1* | 2/2008 | Chai et al. ................. 365/185.03 |

* cited by examiner

*Primary Examiner* — Reginald Bragdon
*Assistant Examiner* — Aracelis Ruiz
(74) *Attorney, Agent, or Firm* — Dennis R. Haszko

(57) ABSTRACT

A method and system for controlling multiple client access to cache memory and a single CAM device. Each client has a corresponding integrity controller in communication with the CAM device and all the other integrity controllers associated with the other clients in the system. Each integrity controller monitors states of the other clients, and inhibits its respective client from executing any operation when a common lookup index is detected during a co-pending operation with a first client. Once the operations of the first client are completed, its integrity controller signals the integrity controller of other clients to exit their inhibit or hold states, thereby allowing the other clients to resume their operations. Another advantage of the integrity controller is that its algorithms also prevents multiple host memory fetches of the same key, thereby saving time and improving system performance.

22 Claims, 10 Drawing Sheets

MULTI-CLIENT CONTENT ADDRESSABLE MEMORY ACCESS CONTROL METHOD

CROSS REFERENCE TO RELATED APPLICATIONS

This application claims the benefit of priority of U.S. Provisional Patent Application No. 61/097,025 filed on Sep. 15, 2008, which is incorporated herein by reference in its entirety.

FIELD OF THE INVENTION

The present invention relates generally to memory access control. More particularly, the present invention relates to systems with a content addressable memory (CAM) device.

BACKGROUND OF THE INVENTION

There are many applications where an associative memory called a content addressable memory (CAM) is used as a look-up table that stores information that can be searched. Example look-up table applications include cache memory subsystems, network address translation, pattern recognition, data compression, and encryption. There are many types of CAM devices known in the art, but they generally follow the same principle of operation.

Generally, the CAM receives search data from the system, executes the search internally, and provides an indication if the search data has been found or not within its memory array. If the search data is found, the indication is referred to as a "hit". Otherwise, the search data is not present in the CAM and the indication is referred to as a "miss". The CAM can provide hit and miss signals, each corresponding to a binary state. In the case of a hit, the CAM provides a lookup index corresponding to, or associated with, the location of the matching data stored in the CAM. The lookup index is then used by the system as a pointer for accessing a location in another memory, such as a cache memory. In the case of a miss, the CAM will provide a lookup index corresponding to, or associated with, a free location in the CAM which can be used for storing data, such as the absent search data. The free location may or may not store search data. However, because there are a finite number of storage locations in the CAM, a storage location storing search data may be released to store new search data. Accordingly, any search for this new search data will yield the same lookup index. The problem arising from this is discussed later. With this understanding of the general operation of a typical CAM device, the following outlines an example system that uses a CAM device.

FIG. 1 is a block diagram of a multi-client CAM system 5 of the prior art. This system consists of one CAM device 10, any number of clients 12 (Named Client 0 to Client N) which can access CAM device 10, cache memory 14, a key fetch engine 16, and host memory 18. By example, there can be up N clients, where N can be any non-zero integer value. A client 12 can be an application or separate sub-system that requires data stored in CAM device 10. Since each client 12 can access CAM device 10 asynchronously by sending index requests, such as "Index request A", an arbiter 11 is provided for regulating and/or controlling accesses to the CAM device 10 in accordance with any suitable algorithm that ensures fair access to the CAM device 10 by all the clients 12. For example, arbiter 11 can decide which client 12 should gain access first based on time of the request. The arbiter 11 can be a state machine implemented with logic that can be integrated within CAM device 10 or implemented as a separate circuit block. All the clients 12 can access the cache memory 14, which stores information such as key data that is pointed to by the lookup index provided by CAM device 10. All the clients 12 can instruct the key fetch engine 16 to access some other higher latency location, such as host memory 18 for example, to retrieve data that is not in the cache memory 14. Those skilled in the art should understand that cache memory 14 is intended to be a high speed and low latency storage means to improve performance of the system.

In general operation, any client 12 can send an index request (search data) to CAM device 10. If there is a hit, the corresponding lookup index is returned to the client 12 by CAM device 10 with the active logic level hit signal, which can be either a logic "1" or a logic "0". The client 12 will then access cache memory 14 to retrieve or read the key data at the memory location pointed to by the lookup index. However, if there is a CAM lookup miss, an available lookup index is returned to client 12 with the active logic level miss signal (either logic "1" or "0"). The miss status also means that there is no corresponding key data in cache memory 14. Therefore the client 12 must execute specific algorithms for retrieving the desired key data from host memory 18, write the corresponding key data into the cache memory 14, and write the search data to CAM device 10. Those skilled in the art should understand that this is a time consuming process which degrades system performance and is the motivation for specifying a local cache in the design.

The delay between CAM index grants and the latency of updating the local cache contents in the presence of multiple requests can lead to corruption of the CAM device 10, especially in the presence of a Least Recently Used (LRU) entry eviction algorithm. In short, an LRU entry eviction algorithm is used when there are no empty storage locations in the CAM device 10 for storing new search data, thus the entry which has been tagged as being the least frequently requested is made available for storing the new search data. This means that statistically, there is a low probability for this entry in the CAM device 10 to be requested in the future, hence the entry should be made available for an entry that potentially has a higher probability to be requested. In particular, these problems occur due to the time required for populating the cache memory 14 and the search data in CAM device 10 in the event of a miss. There are at least the following specific problems in the system of FIG. 1, where there are multiple clients 12 that can make requests of a single CAM device 10.

Using the previously described example, a search request for the same search data by a second client 12 after a missed search request from a first client 12, can cause erroneous key data to be retrieved from the cache memory 14 by the second client 12. As previously mentioned, the CAM device 10 treats the second identical search request as a hit, even though the first search request resulted in a miss. Now the lookup index provided by the CAM device 10 is considered by the second client 12 to point to corresponding key data stored in the cache memory 14. Unfortunately, due to the delay of the key data fetching operation, also referred to as a memory fetch operation, from the host memory 18 initiated by the first client 12, the proper key data will not be loaded into the cache memory location in time for the second client 12. Therefore, erroneous key data will be obtained by the second client 12.

In another example, when a first client 12 receives a miss status for its search request based on Index A, it receives an available lookup index (Position X for example), and the time-intensive key fetching process from the host memory 18 is executed. However, a second client 21 can initiate multiple search requests each resulting in a hit. This can result in tagging of the newly assigned lookup index as the least recently used one. If another client 12 sends a search request differing from that of the first client 12 that results in a miss, then the CAM device 10 will assign lookup index (Position X) since it is tagged as the least recently used one. Therefore, the same available lookup index is provided to two different clients 12, even though both had misses based on different search data.

It is, therefore, desirable to provide a system and method to maximize efficient and reliable use of a single CAM by multiple clients, while preventing corruption of CAM contents in the presence of an LRU entry eviction algorithm.

SUMMARY OF THE INVENTION

It is an object of the present invention to provide a system and method to maximize efficient and reliable use of a single CAM by multiple clients, while preventing corruption of CAM contents in the presence of an LRU entry eviction algorithm.

In a first aspect, the present invention provides a method of controlling access of at least two clients to a cache memory and a content addressable memory (CAM) device. The method includes detecting common lookup indices provided by the CAM device to the at least two clients in response to search requests issued by each of the at least two clients to the CAM device; detecting a pending cache write memory operation initiated by one of the at least two clients in response to a corresponding search request; and, inhibiting a new cache memory operation for another of the at least two clients until the pending cache write memory operation is completed in response to the common lookup indices being detected. According to a present embodiment, detecting common lookup indices includes issuing a first search request of the search requests by a first client of the at least two clients. Detecting common lookup indices includes issuing a second search request of the search requests by a second client of the at least two clients, after the first search request is issued. The CAM device provides a first lookup index in response to the first search request and a second lookup index in response to the second search request. The common indices include the first lookup index and the second lookup index having identical values. Detecting common lookup indices further includes comparing the first lookup index to the second lookup index, and providing an index match output signal when the first lookup index to the second lookup index match. The step of inhibiting then includes preventing generation of a grant signal in response to the index match output signal when the pending cache write memory operation is detected, where the grant signal enables execution of the new cache memory operation.

According to an aspect of the present embodiment, detecting a pending cache write memory operation includes initiating the pending cache write operation in response to a miss status of the first search request, and initiating the pending cache write operation includes setting a write status to an active logic state. The step of inhibiting then includes preventing generation of a grant signal in response to the active logic state of the write status when the common lookup indices are detected, where the grant signal enables execution of the new cache memory operation. In another aspect of the present embodiment, the pending cache write memory operation includes transferring data from a memory to the cache memory, where the new cache memory operation is a read operation when the CAM device response status is a hit condition in response to the second search request. The first client therefore reads data from the cache memory pointed to by the first lookup index, and the second client reads the data from the cache memory pointed to by the second lookup index.

In yet another aspect of the present embodiment, the cache write memory operation is a first cache write memory operation, and the new cache memory operation is a second cache write operation when the CAM device response status is a miss condition in response to the second search request, where the first search request and the second search request are different. The second lookup index has the same value as the first lookup index when the first lookup index is tagged as being least recently used. The step of inhibiting then includes enabling the second cache write operation when the first cache write memory operation is completed, the first cache write memory operation including reading data from the cache memory pointed to by the first lookup index. The second cache write memory operation includes overwriting the data from the cache memory pointed to by the first lookup index with new data, and reading the new data from the cache memory pointed to by the second lookup index.

In a second aspect, the present invention provides a multi-client content addressable memory (CAM) system. The system includes a content addressable memory (CAM) device, a cache memory, at least two clients, and an access controller. The CAM device provides one of a hit or a miss condition and memory indices in response to search requests. The cache memory stores data addressable by the lookup indices, and executes a cache write memory operation to write new data in response to the miss condition. The at least two clients issue the search requests. The access controller inhibits a new cache memory operation corresponding to a second client of the at least two clients until a pending cache write memory operation corresponding to a first client of the at least two clients is completed, in response to common lookup indices received by both the first client and the second client. According to a present embodiment, the access controller includes at least two integrity controllers each corresponding to one of the at least two clients, where one of the at least two integrity controllers is associated with the second client for inhibiting execution of the new cache memory operation. Each of the at least two integrity controllers includes inhibit circuitry for detecting the common lookup indices and an active write status of the cache memory, such that the inhibit circuitry prevents issuance of a grant signal enabling the new cache memory operation when the common lookup indices and the active write status are detected.

In an aspect of the present embodiment, the inhibit circuitry includes an index match circuit and a grant circuit. The index match circuit compares an assigned lookup index provided to a corresponding client of the at least two clients in response to a search request, against all other lookup indices provided to other clients of the at least two clients. The index match circuit provides an index match signal when the assigned lookup index matches at least one of the other lookup indices. The grant circuit prevents issuance of the grant signal to the corresponding client in response to the received index match signal and the active write status. The grant circuit can include memory fetch logic for providing a fetch signal to initiate the new cache memory operation when the active write status is switched to an inactive write status, where the new cache memory operation includes a new cache write memory operation. Alternately, the corresponding client initiates the new cache memory operation when the corresponding grant signal is released by the grant circuit, the new cache memory operation including a new cache write memory operation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for controlling multiple client access to cache memory and a single CAM device. Each client has a corresponding integrity controller in communication with the CAM device and all the other integrity controllers associated with the other clients in the system. Each integrity controller monitors states of the other clients, and inhibits its respective client from executing any operation when a common lookup index is detected during a co-pending operation with a first client. Once the operations of the first client are completed, its integrity controller signals the integrity controller of other clients to exit their inhibit or hold states, thereby allowing the other clients to resume their operations. Another advantage of the integrity controller is that its algorithms also prevents multiple host memory fetches of the same key, thereby saving time and improving system performance.

Figure 1:
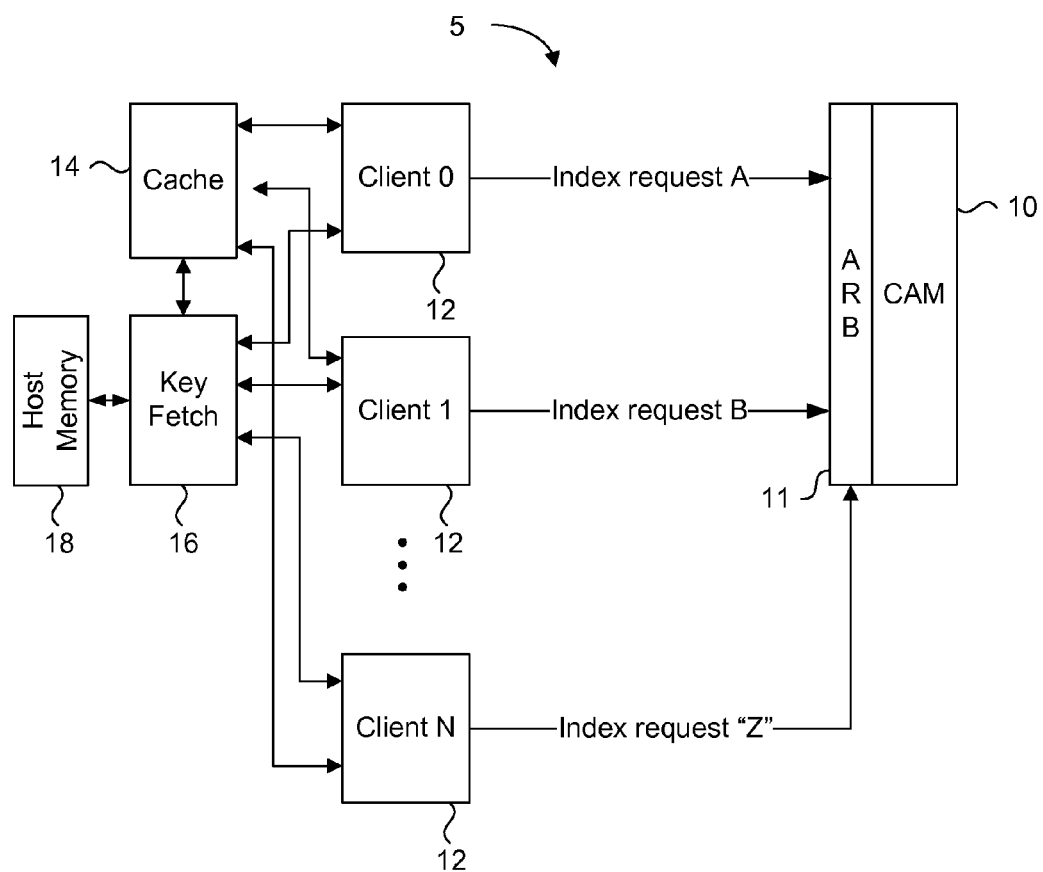
FIG. 1 is a block diagram of a multi-client CAM system of the prior art.
Figure 2:
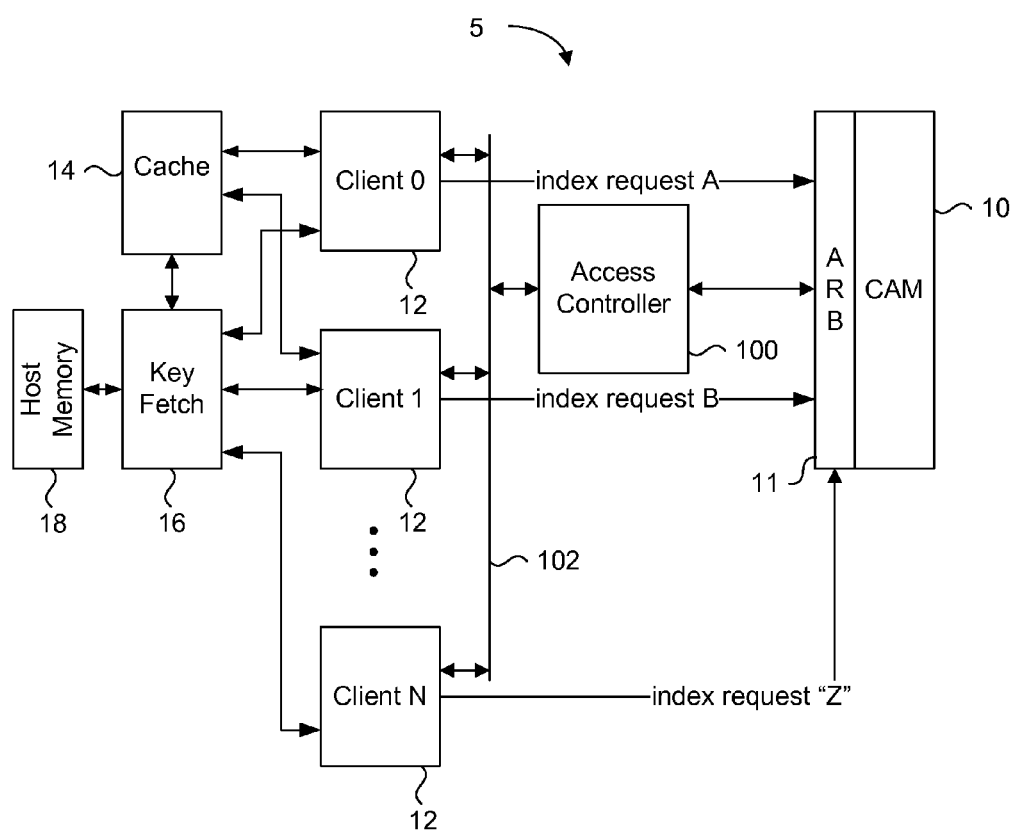
FIG. 2 is a block diagram of a multi-client CAM system, according to an embodiment of the present invention.

FIG. 2 is a block diagram of a multi-client CAM system 5, according to an embodiment of the present invention. The same numbered elements of FIG. 2 have been previously shown and described for FIG. 1. The difference between the system of FIG. 1 and the system of FIG. 2 is the inclusion of an access controller 100 and CAM request status vector 102, simply referred to as a status vector from this point forward. The access controller 100 conceptually represents a collection of integrity controllers 110 (FIG. 3A), where each integrity controller 110 (FIG. 3A) is associated with one of the clients 12 for controlling its client 12 in response to the status signals provided by the other integrity controllers 110 (FIG. 3A) and the CAM device 10. In one example embodiment, each integrity controller 110 (FIG. 3A) is integrated with its client 12. In a second example embodiment, each integrity controller 110 (FIG. 3A) is implemented as a standalone device, or they can all be integrated together into the shown access controller 100 of FIG. 2. The status vector 102 notifies each client 12 of outstanding requests and CAM response status (hit or miss). This information controls the integrity controllers 110 (FIG. 3A) corresponding to each client 12. The status vector 102 is a conceptual representation of busses that carry signal information provided by and received by the integrity controllers and the clients 12. Each integrity controller 110 (FIG. 3A) effectively broadcasts certain information to all the other integrity controllers 110 (FIG. 3A) coupled to the status vector 102. Persons skilled in the art will understand that the physical layout of the components of the system of FIG. 2 can be optimized to meet at least one of performance and area parameters.

Figure 3A:
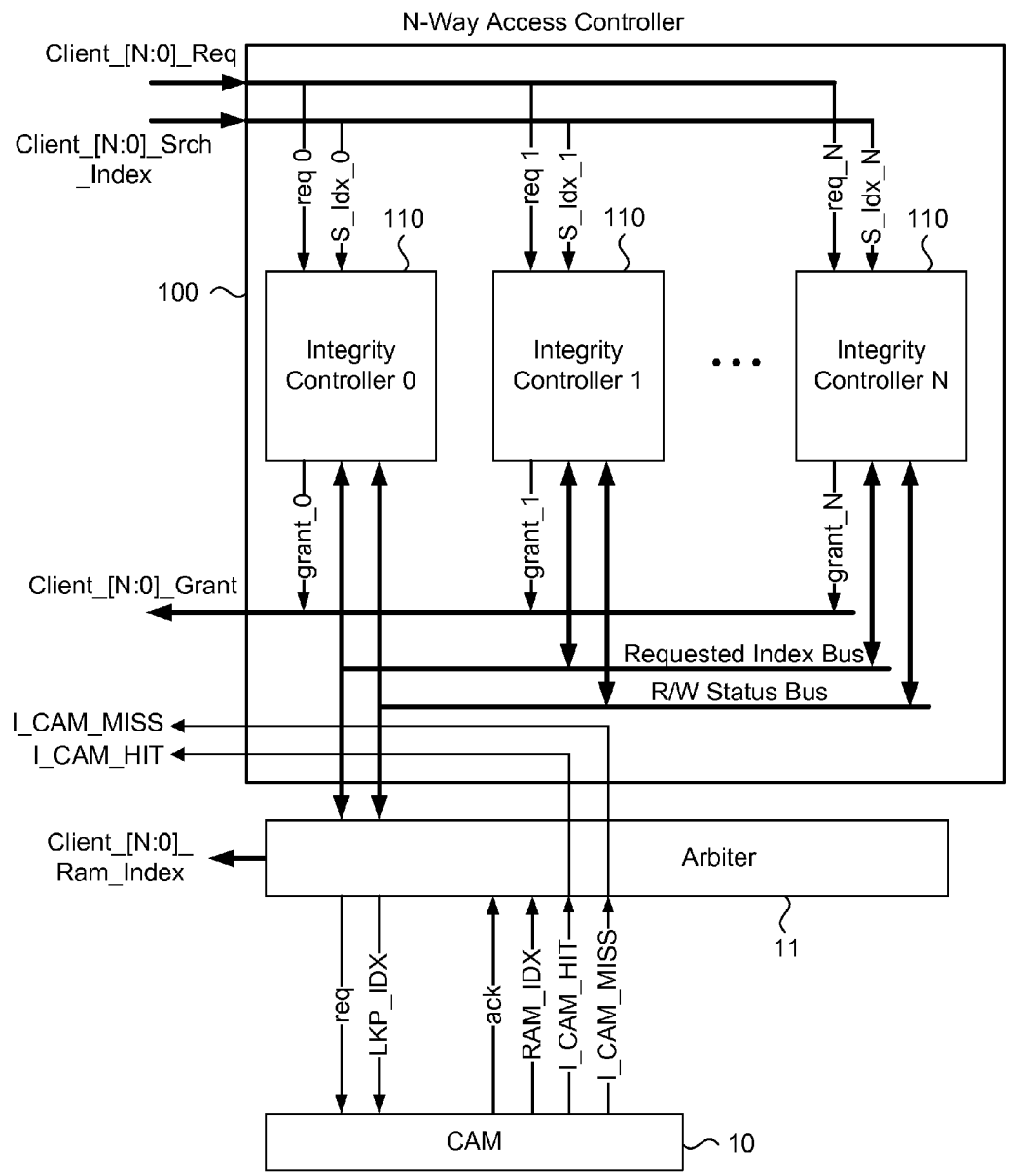
FIG. 3A is a block diagram of the access controller shown in FIG. 2, according to one embodiment of the present invention.

In operation, each client 12 can asynchronously send search requests directly to CAM device 10 independently of each other, resulting in hit/miss signals and a lookup index being returned to the requesting client 12. Any client 12 that initiates an active write to the cache memory 14 in response to a miss is detected by all the other integrity controllers 110 (FIG. 3A) via status vector 102. The active write is analogous to the previously described key fetching process. If a second client 12 sends a search request while the write initiated by a first client 12 is pending, i.e. not completed, then the integrity controller 110 (FIG. 3A) for the second client 12 checks if its request results in a returned lookup index that is the same one returned to the first client 12 and its integrity controller 110 (FIG. 3A). In such a situation, both clients 12 have co-pending operations. If the returned indices match, then the integrity controller 110 (FIG. 3A) places the second client 12 into a hold state and prevents the second client 12 from completing its operation until the operations of the first client 12 are completed. When the first client 12 has completed its operation, the second client 12 is released from its hold state and permitted to execute its operation on the basis of the received lookup index previously used by the first client 12. In the present embodiment, the second client 12 proceeds with its operation with the assumption that the lookup index provided to the first client 12 is now available.

FIG. 3A is a block diagram showing a first example embodiment of the access controller 100 shown in FIG. 2, also referred to as an N-way access controller. Access controller 100 includes up to N integrity controllers 110 (i.e. Integrity Controller 0, . . . , Integrity Controller N), where N is an integer number that corresponds to N clients in the system. The CAM device 10 and arbiter 11 associated with the CAM device 10 are shown in FIG. 3A. Each integrity controller 110 is connected to a corresponding client 12, such that it receives a client search request status signal (ie. req_0) and a client search index (ie. S_idx_0), which includes a search data value that is eventually sent to the CAM as the search request. The bus of search requests is annotated as Client_[N:0]_Req, while the bus of search indices is annotated as Client_[N:0]_Srch_Index. Each integrity controller 110 provides a dedicated grant signal (ie. grant_0), shown as signal bus Client_[N:0]_Grant, to its respective client 12. The grant signal can be used to release a client 12 from a hold state, and optionally can be used to initiate a memory fetch process for populating the cache memory 14 with key data from a low latency memory, such as host memory 18 of FIG. 2. Such a memory fetch process would be executed by the client 12 in response to the grant signal. The CAM device 10 provides several well-understood signals to arbiter 11 in response to the CAM search request for stored data matching the search data value of the provided client lookup index (ie. S_Idx_0), which includes a lookup index that is provided to its respective client 12. The lookup index is an address in the cache memory that contains information corresponding to the search data value of the provided client lookup index. In the event that the search data value is not located within the CAM device 10, then the provided memory index is an address in the cache memory available for storing the corresponding information. The bus of lookup indices is annotated as Client_[N:0]_Ram_Index. A R/W Status Bus for indicating read/write status of the CAM device 10 and a Requested Index Bus is provided to arbiter 11 by each of the integrity controllers 110. CAM hit/miss status signals are provided directly to all the clients 12, and are used by each client 12 in conjunction with its corresponding received grant signal to generate control signals for initiate the memory fetch process and reading of the key data from the cache memory 14. In the presently shown embodiment, the Requested Index Bus carries the lookup indices provided by CAM device 10. While not shown in FIG. 3A, the individual lookup indices of the Requested Index Bus are L_Idx_0 to L_Idx_N.

Figure 3B:
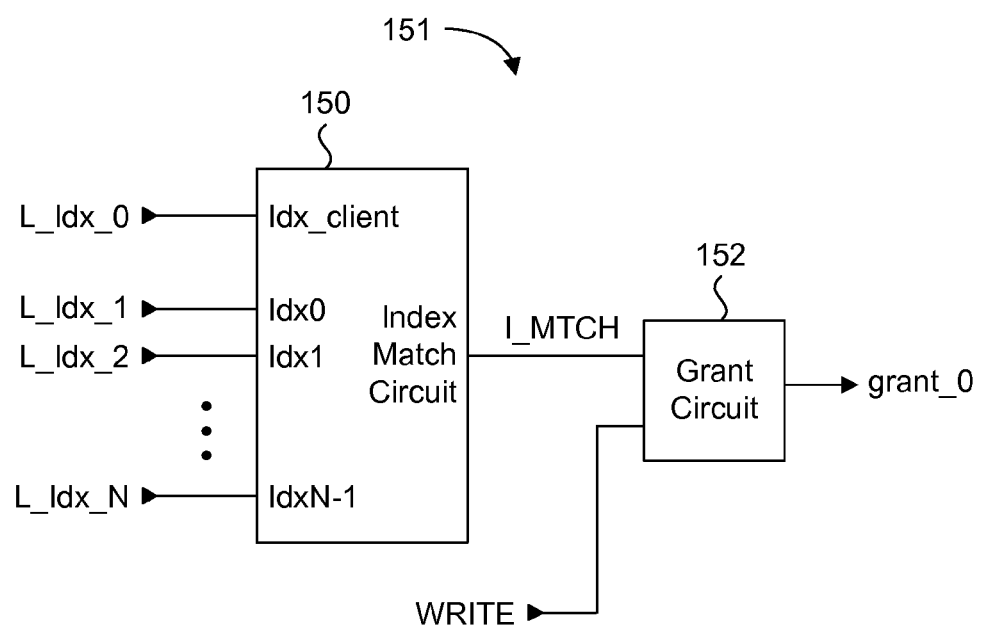
FIG. 3B is a block diagram of inhibit circuitry used in each of the integrity controllers of FIG. 3A, according to a present embodiment.

FIG. 3B is a block diagram of inhibit circuitry 151 used in each of integrity controllers 110 of FIG. 3A. This circuit 151 is responsible for detecting a common lookup index issued to a corresponding client 12 and to any other client 12, and inhibiting operations of the corresponding client 12 if there is a pending memory fetch operation when a common lookup index match is detected. The inhibit circuitry 151 includes an index match circuit 150 and a grant circuit 152. The inhibit circuitry 151 shown in FIG. 3B is by example configured for Integrity Controller 0 of FIG. 3A. The index match circuit 150 has a dedicated input Idx_client for receiving a lookup index corresponding to its client (i.e. Client 0), and monitor inputs idx0 to idxN−1 for receiving lookup indices provided to all the other clients (i.e. Client 1, . . . to Client N). The output of index match circuit 150 is an index match output signal I_MTCH having a logic state representing the presence of a match or a mismatch between the monitor inputs and the dedicated input. For example, the index match circuit 150 can include circuits for logically OR'ing the monitor inputs, and the output can be logically AND'ed with the dedicated input. In an example logical OR'ing operation, if any one of the monitor inputs receives a lookup index that is the same as the lookup index received at the dedicated input, then index match output signal I_MTCH can be driven to a logic "1" signal to represent the presence of a match. Otherwise, I_MTCH remains at a logic "0" level.

The grant circuit 152 receives I_MTCH and a status signal WRITE from the cache memory. The WRITE signal remains at a predefined logic level while the pending memory fetch operation is incomplete. As previously discussed, a memory fetch operation can been initiated by another client 12 in response to a cache miss scenario, whereby search data provided to the CAM 10 resulted in a miss condition and key data is copied from a host memory 18 to a cache memory 14. When the memory fetch operation is complete, meaning that the cache memory 14 is loaded or written with key data, the WRITE signal changes to an opposite logic level. An enable/disable signal grant_0 for Integrity Controller 0 is driven to one logic level to inhibit its corresponding client 12 (i.e. Client 0) from executing further operations if both WRITE or I_MTCH are at logic levels corresponding to a pending memory fetch operation or a lookup index match, respectively. When the memory fetch operation is complete, WRITE changes its logic level and grant_0 is driven to an opposite logic level to release the corresponding client from its hold state. The logic of grant circuit 152 can be implemented as an NAND operation between WRITE and I_MTCH.

Following are example operations of the inhibit circuit of FIG. 3B. In a first example scenario, if the dedicated input mismatches any of the monitor inputs, then I_MTCH can be at an inactive logic level=0. In this case, WRITE is ignored and grant_0 is set to an active logic level=1, thereby allowing the corresponding client to continue its operation. In a second example scenario, if the dedicated input matches any of the monitor inputs, then I_MTCH can be driven to an active logic level=1. In this case, if WRITE=1 indicating that a memory fetch operation is still pending, then grant_0 is set to an inactive logic level=0, thereby inhibiting the corresponding client from proceeding further with its operation.

The inhibit circuit of FIG. 3B has been configured for Integrity Controller 0 of FIG. 3A. Those skilled in the art should understand how the inhibit circuit would be configured for the other integrity controllers 110 (i.e. Integrity Controller 1, . . . , Integrity Controller N). For example, the inhibit circuit 150 for Integrity Controller 1 would receive lookup index L_Idx_1 at its dedicated input, and all the remaining lookup indices are received at the monitor inputs.

In the present embodiment, the clients 12 are responsible for executing fetching operations in the event of a miss. In particular, when a client 12 receives an active logic level grant signal and an active logic level miss signal (I_CAM_MISS), the client 12 will then proceed and initiate the necessary algorithms for fetching and loading the cache memory 14 with the required key data. Then it can read the key data after it has been written to the cache memory 14.

Figure 4A:
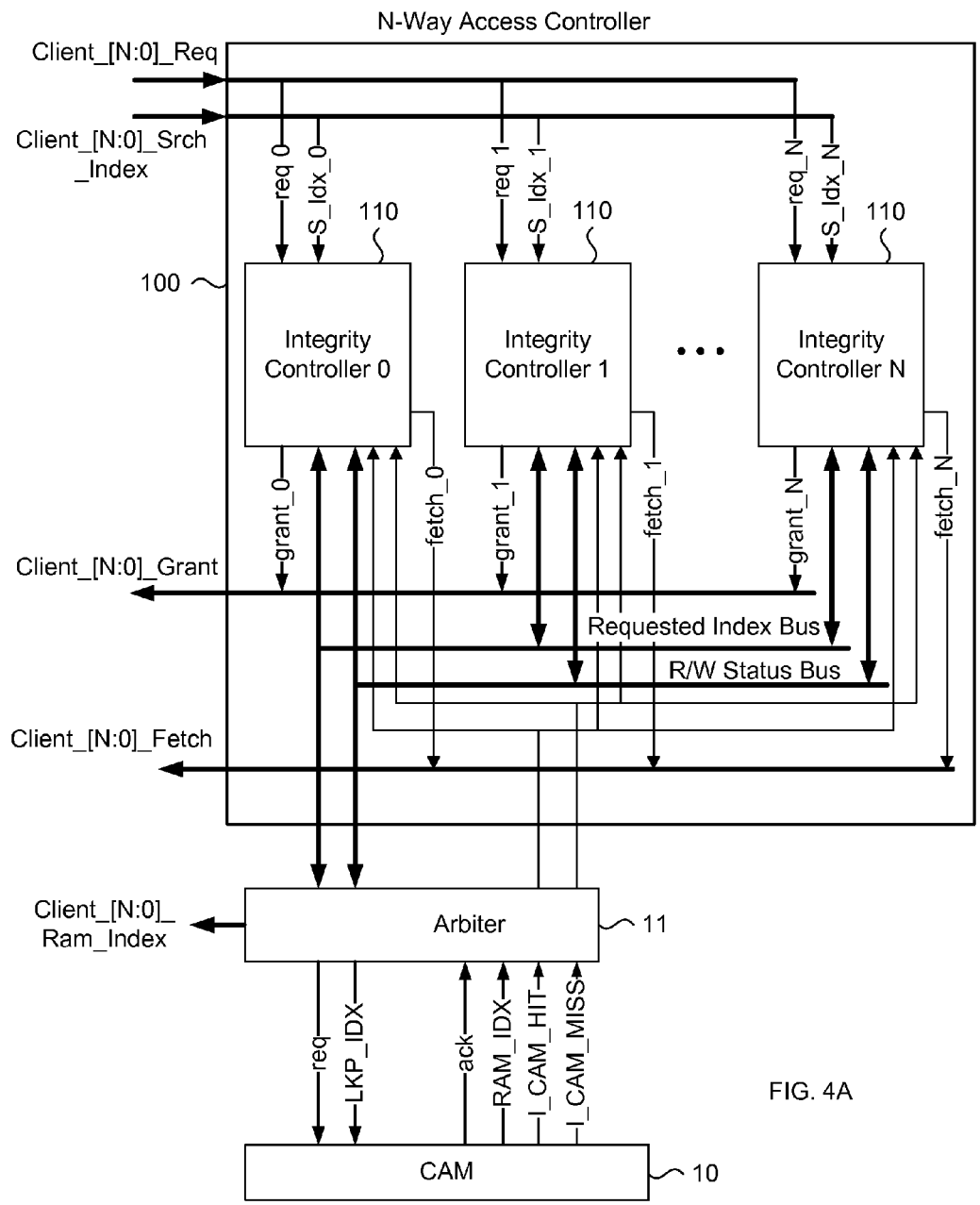
FIG. 4A is a block diagram of the access controller shown in FIG. 2, according to another embodiment of the present invention.

FIG. 4A is a block diagram showing a second example embodiment of the access controller 100 shown in FIG. 2. This version of the access controller 100 is similar to the access controller 100 shown in FIG. 3, except that the integrity controllers 110 are modified such that each receives CAM hit and miss signals I_CAM_HIT and I_CAM_MISS, and each provides a fetch control signal such as fetch_0 from Integrity Controller 0 to initiate the key fetching process from the host memory 18 in the event of a miss. A bus annotated Client_[N:0]_Fetch represents the grouping of the individual fetch control signals fetch_0 to fetch_N provided by each integrity controller 110. The fetch control signals can be provided to key fetch engine 16 directly, or to other similar key fetch logic. In either case, it is no longer the responsibility of the clients 12 to initiate this process. In the present embodiment, the grant signal is provided to its corresponding client 12 only when the integrity controller 110 has received an indication that the key data has been successfully loaded/written into the cache memory 14, or in the event of a hit condition since the key data is already available in the cache memory 14. Then the grant signal allows the client to simply proceed and read the key data from the cache memory 14.

Figure 4B:
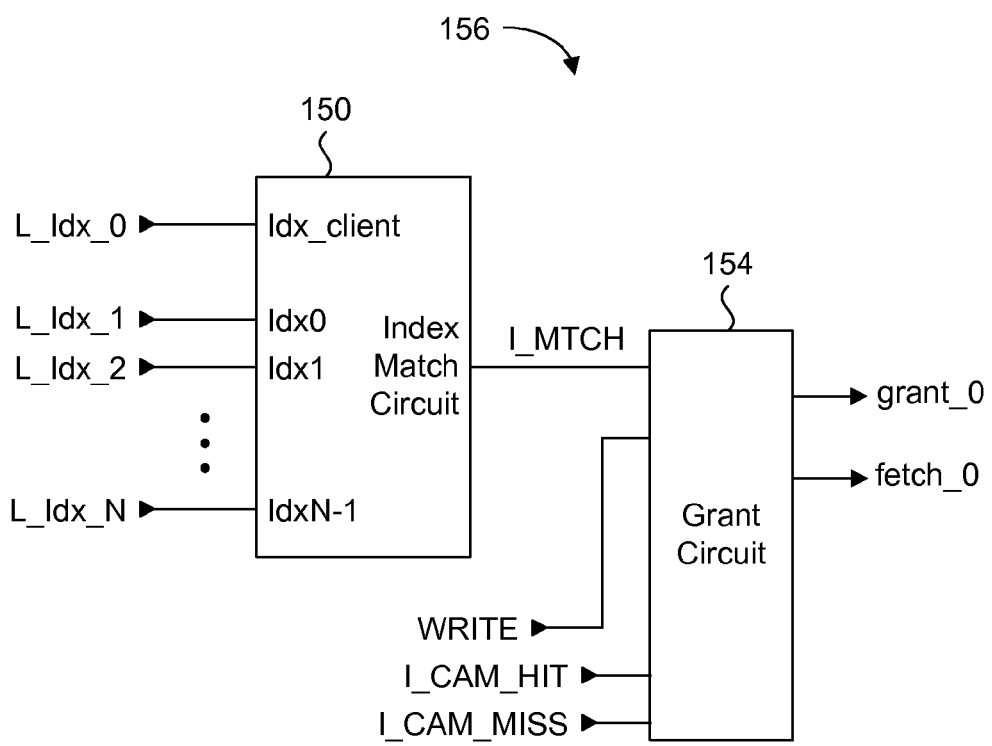
FIG. 4B is a block diagram of inhibit circuitry used in each of the integrity controllers of FIG. 4A, according to a present embodiment.

FIG. 4B is a block diagram of inhibit circuitry 156 used in each of integrity controllers 110 of FIG. 4A. This circuit is similar to the inhibit circuitry of FIG. 3B and includes the same index match circuit 150. Instead of grant circuit 152, a modified grant circuit 154 is provided. In addition to receiving index match output signal I_MTCH from index match circuit 150 and the same WRITE signal, grant circuit 154 receives CAM hit and miss signals I_CAM_HIT and I_CAM_MISS. In addition to providing a grant signal, such as grant_0 for Integrity Controller 0, grant circuit 154 provides a fetch signal fetch_0 on behalf of its respective client 12 (i.e. Client 0). In the event of a miss condition for search data provided by the corresponding client (i.e. Client 0 in the present example), I_CAM_MISS will be at a predetermined logic level indicative of a miss condition. Fetch signal fetch_0 is then driven to a logic level for initiating the memory fetch operation. Accordingly, if there is a pending memory fetch operation for another client 12 (i.e. Client 1, or Client 2, or . . . , Client N), the memory fetch operation for client 12 (i.e. Client 0) will follow immediately after the pending operation is completed. Therefore the WRITE signal will remain at the same logic state while the memory fetch operation for client 12 (i.e. Client 0) is pending. Once the memory fetch operation for client 12 (i.e. Client 0) is complete, meaning that the key data is now stored in the cache memory 14, the grant signal grant_0 is driven to a logic level for enabling client 12 (i.e. Client 0) to read the key data from the cache memory 14.

In the event of a hit condition, for search data provided by the corresponding client 12 (i.e. Client 0 in the present example), I_CAM_HIT will be at a predetermined logic level indicative of a hit condition. If there is no pending memory fetch operation for another client 12 (i.e. Client 1 or Client 2 or . . . Client N), or when a pending memory fetch operation for another client 12 (i.e. Client 1 or Client 2 or . . . Client N) is complete, WRITE will have a corresponding logic level and grant_0 will be driven to the appropriate logic level for enabling client 12 (i.e. Client 0) to read the key data from the cache memory 14.

Figure 5A:
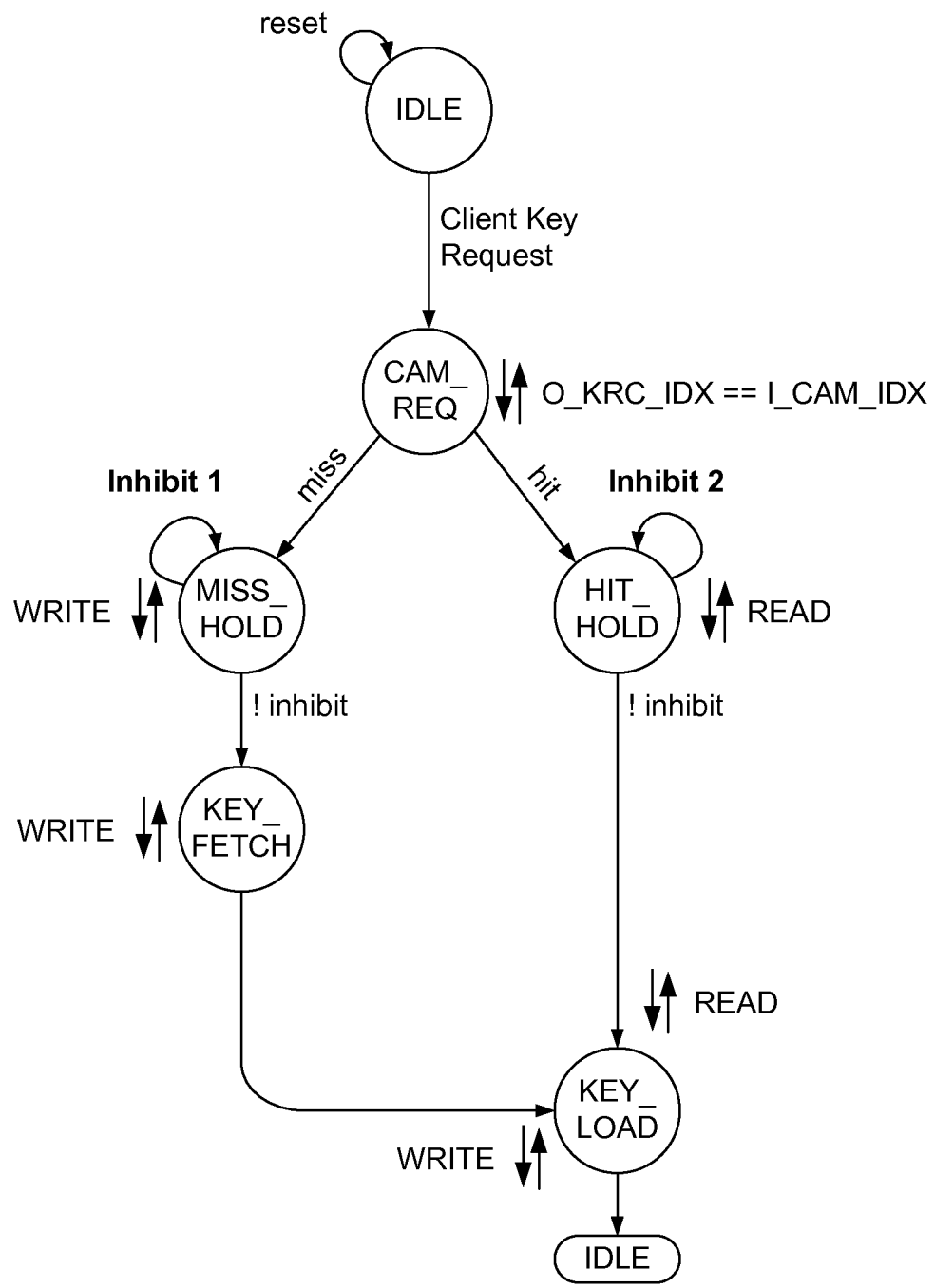
FIG. 5A is a state machine diagram illustrating the general inhibit processes executed by an integrity controller, according to an embodiment of the present invention.

FIG. 5A is a state machine schematic illustrating the general inhibit processes executed by each of the integrity controllers described in the previous embodiments. This state machine is implemented as logic within each integrity controller. The following description assumes that there is a first client 12 and a second client 12, and the following description assumes that the second client 12 issues its search request after the first client 12. The state machine inhibits processes of the second client 12 after either a hit and a miss status of its search request when the first client 12 has a pending operation resulting in a lookup index that is the same as the one to be used by the second client. Accordingly, if two pending search requests result in different lookup index, then the algorithm of FIG. 5A ends at the "CAM_REQ" state, and the second client 12 is free to operate. On the other hand, the algorithm can enter either the Inhibit 1 branch or the Inhibit 2 branch when the same lookup index is provided to the first client 12 and the second client 12.

The Inhibit 1 branch is entered by the second client 12 in a miss condition, and remains in a "MISS_HOLD" state until the first client 12 has completed its memory fetch operation. This is referred to as the Inhibit 1 case, where a pending or active write operation based on the common lookup index initiated by the first client 12 has been detected. By example, the second integrity controller 110 can monitor for an active write status signal issued by the first integrity controller 110 when the first client 12 initiates a memory fetch operation. In response to this, the second client 12 remains in the "MISS_HOLD" state until the fetch operation by the first client 12 is completed. Since the second client 12 received a miss result, it can then enter the "KEY_FETCH" and subsequent "KEY_LOAD" states, where the key data is obtained from the host memory 18, loaded into the cache memory 14 and read out by the second client 12. Generally, the Inhibit 1 case prevents multiple fetching of a same missed entry, and prevents eviction of a granted lookup index due to LRU of same.

The Inhibit 2 branch is entered by the second client 12 in a hit condition, and remains in a "HIT_HOLD" state until the first client 12 has completed its memory fetch operation. This is referred to as the Inhibit 1 case, where a pending or active write based on the common lookup index initiated by the first client 12 has been detected. Once again, the second integrity controller 110 can monitor for an active write status signal issued by the first integrity controller 110 when the first client 12 initiates a fetch operation. When the fetch operation initiated by the first client 12 is completed, the second client 12 is freed from its "HIT_HOLD" state, and is then allowed to enter the "KEY_LOAD" state for reading the key data from the cache memory 14. Generally, the Inhibit 2 case ensures that the key data is present in the cache memory 14 before it is read, or retrieved by the second client 12.

Figure 5B:
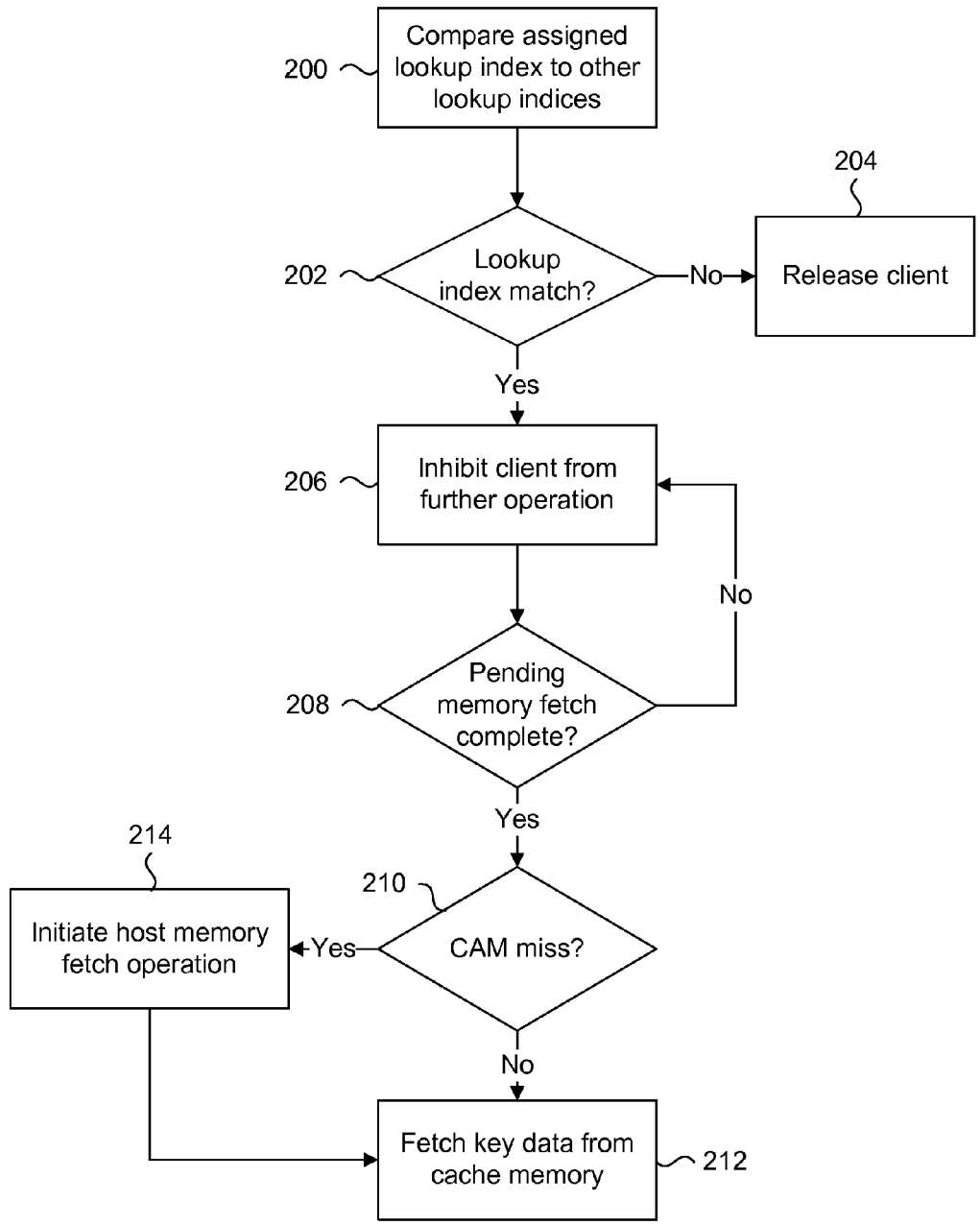
FIG. 5B is a flow chart illustrating a method for inhibiting a client from accessing cache memory, according to a present embodiment.

FIG. 5B is a flow chart of a method for inhibiting a client 12 from fetching key data or initiating a memory fetch operation in the event that it receives a lookup index that has previously been issued to another client 12. This method is executed by the system of FIG. 2. The method assumes that the corresponding client 12 has issued a search data request to the CAM 10 and the CAM 10 issues a lookup index back to the integrity controller 110 via its corresponding client 12. The following method is described with reference to the inhibit circuits of FIGS. 3B and 4B. The method starts at step 200 where the integrity controller 110 compares the lookup index it has received from the CAM 10 in response to the search data request from its client 12, to the lookup indices provided by the other clients 12 in response to their search data requests. This operation can be executed by the logic of index match circuit 150. If there is no match determined at step 202, the client 12 is enabled to continue operations at step 204. This is done via the issued grant signal which allows the client 12 to either initiate a memory fetch operation or to obtain the key data from the cache memory 14. It is assumed that by default, the client 12 is not permitted to execute such operations until the grant signal is received.

In the case of a match, the method proceeds to step 206 where the client 12 is inhibited from executing any key data fetch or memory fetch operation. The integrity controller 110 for the client 12 then checks to see if a memory fetch operation is pending or completed at step 208. This status is determined by the state of the WRITE signal in FIG. 3B. While the memory fetch operation is pending, the client remains inhibited from executing its operation, which is shown in FIG. 5B with the loopback arrow to step 206. When the pending memory fetch operation is complete, the method proceeds to step 210 where the client 12 is released to execute one of two different operations, depending on the miss/hit status of the search data request. In the present embodiments, the client 12 is released via the issuance of the grant signal having a specific logic level, such as grant_0 in FIGS. 3B and 4B. At step 210 if the CAM 10 reported a hit, then the method ends at step 212 where the client 12 reads the key data from the cache memory 14. If the CAM 10 reported a miss, then the method proceeds to step 214 where the client 12 initiates a host memory fetch operation as described for the embodiment of FIG. 3B. Once the memory fetch operation is completed the client 12 reads the key data from the cache memory 14 at step 212. Alternately, the integrity controller 110 may have already initiated the memory fetch operation before the grant signal is issued as described for the embodiment of FIG. 4B.

Figure 6:
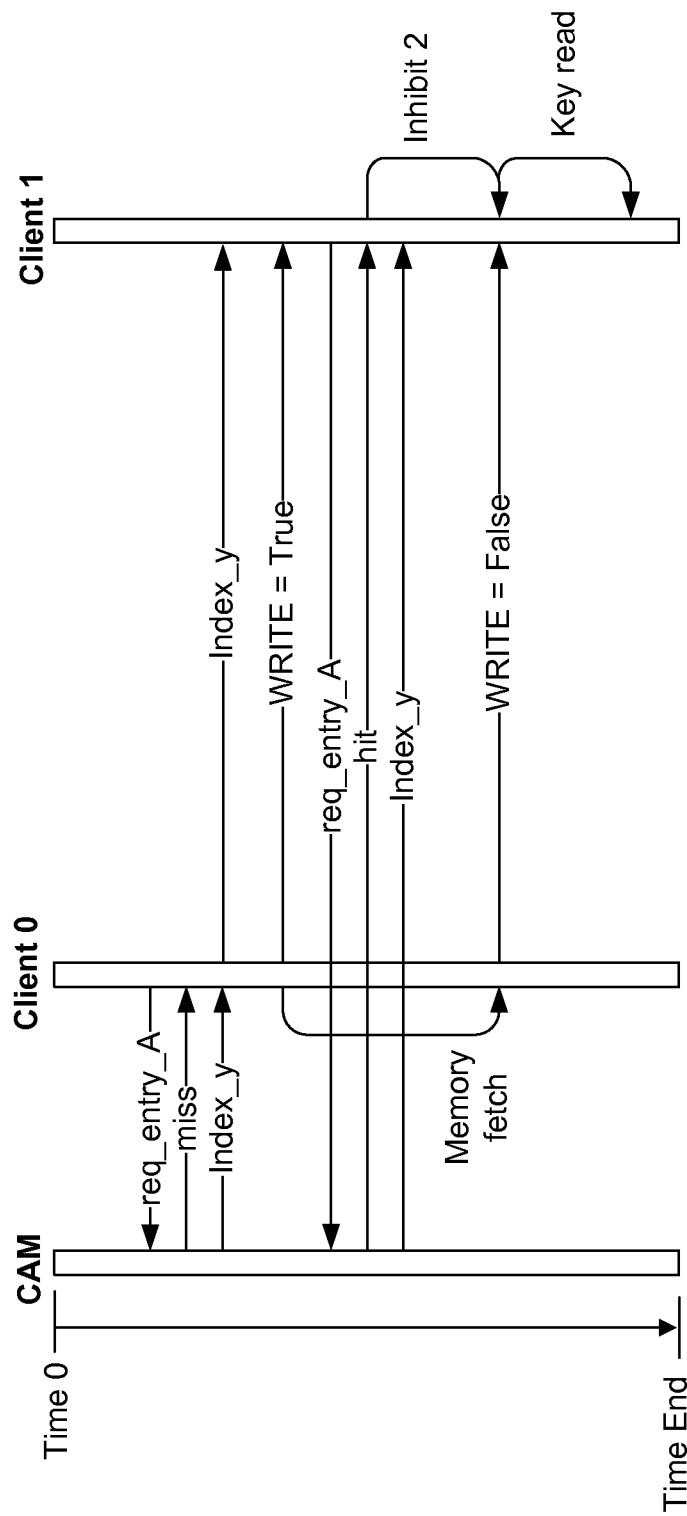
FIG. 6 is an example illustration showing inhibited access to a CAM.

FIG. 6 is an example scenario involving two clients, Client 0 and Client 1, both asynchronously accessing a CAM. FIG. 6 illustrates via a vertical time scale, the events which occur starting from the Time 0 marker to the Time End marker. Each event is illustrated by a directional line, which denotes the direction of communication of the signal or information. It is noted that the general sequence of events are illustrated, and specific elapsed time between events are not shown.

Following is a description of the sequential operation of the clients 12 and the CAM 10 shown in FIG. 6. Client 0 sends a search data request "req_entry_0" to the CAM 10, and since the CAM 10 does not have the entry stored in memory 18, it issues a miss and an available lookup index "Index_y'" to Client 0. Client 0 then issues an active WRITE signal to Client 1, and sends index_y to Client 0 at substantially the same time. Occurring while the WRITE signal is issued, Client 0 initiates the memory fetch operation. While the memory fetch operation is in process, or pending, Client 1 asynchronously sends the same search request "req_entry_0" issued by Client 0, to the CAM 10. Because the CAM 10 provided "Index_y" as a valid lookup index to be used, the CAM 10 reports a hit and provides "Index_y" as the lookup index to be used for accessing the cache memory 14. Upon receiving the hit status from the CAM 10 and detecting common lookup index from Client 0, Client 1 enters the Inhibit 2 state shown in FIG. 5A. Client 1 is then prevented from executing any operations, such as its key read operation from the cache memory 14 because there is no certainty that the correct key has been written to the cache memory 14 yet. Eventually, the correct key data is written to the cache memory 14 and retrieved by Client 0. After retrieval, or reading by Client 0, Client 0 toggles its WRITE signal to an inactive logic level. This is detected by the integrity controller for Client 1, and Client 1 is then enabled to read out the same key data from the cache memory 14.

It is noted that if there were more clients 12 involved, such as a Client 2 and Client 4 for example, Client 0 would be sending "Index_y" to both Client 2 and Client 3, with the active WRITE status signal.

Figure 7:
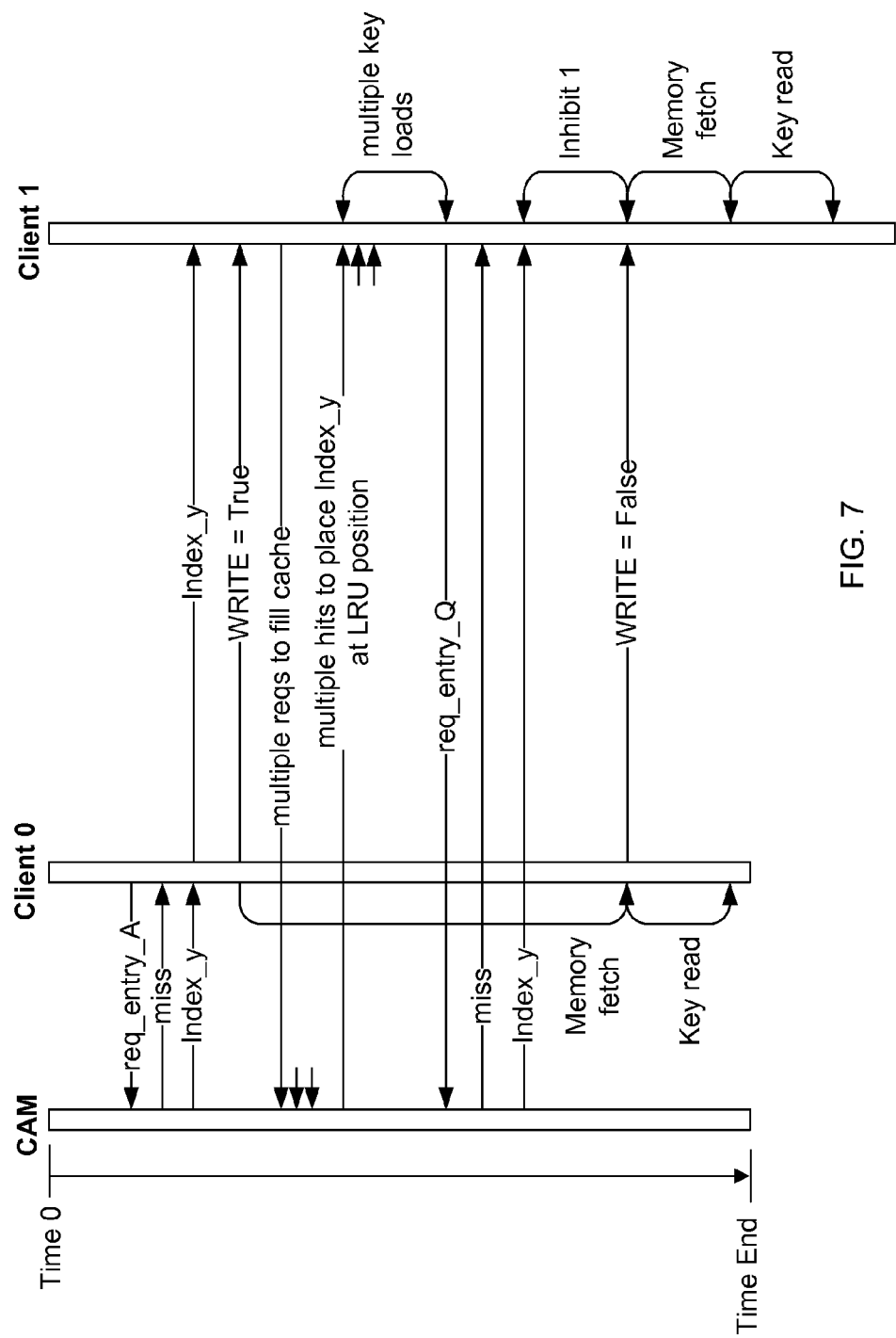
FIG. 7 is another example illustration showing inhibited access to a CAM.

FIG. 7 is an example scenario involving two clients, Client 0 and Client 1, both asynchronously accessing a CAM 10. FIG. 7 illustrates via a vertical time scale, the events which occur starting from the Time 0 marker to the Time End marker. Each event is illustrated by a directional line, which denotes the direction of communication of the signal or information. It is noted that the general sequence of events are illustrated, and specific elapsed time between events are not shown.

Following is a description of the sequential operation of the clients 12 and the CAM 10 shown in FIG. 7. Client 0 sends a search request (req_entry_0) to the CAM 10, and since the CAM 10 does not have the entry stored in memory 18, it issues a miss and an available lookup index "Index_y" to Client 0. Client 0 then issues an active WRITE signal to Client 1, and sends "Index_y" to Client 1 at substantially the same time. Occurring while the WRITE signal is issued, Client 0 initiates the memory fetch operation. While the memory fetch operation is in process, or pending, Client 1 asynchronously issues multiple search requests to fill the cache memory. In response, the CAM issues multiple corresponding hits. It is assumed that "Index_y" is now tagged as the LRU position since all the other lookup indices have been recently used. Client 1 then sends a search request "req_entry_Q" to the CAM 10. This search request is different than the initial one sent by Client A, and it is assumed that this results in a miss. However, because "Index_y" has been tagged as the LRU position, the CAM 10 provides Index_y as being available for writing the mismatched search request data. "Index_y" is sent to Client 1, which triggers the Inhibit 1 state shown in FIG. 5 because Index_y is the common lookup index resulting from the search requests of both Client 0 and Client 1. Client 1 is then prevented from executing any operations, such as its memory fetch operation. Client 0 is thus inhibited from reading the key data corresponding to "Index_y", which does not correspond to "req_entry_Q". As in FIG. 6, "Index_y" provided by the CAM for Client 0 and Client 1 are propagated to any other clients 12 in the system 5.

Eventually, the key data corresponding to "req_entry_0" is written to the cache memory 14 and retrieved by Client 0. After retrieval, or reading by Client 0, Client 0 toggles its WRITE signal to an inactive logic level. This is detected by the integrity controller for Client 1, and Client 1 is then permitted to initiate its memory fetch operation for "Index_y". Now that Client 0 has obtained is key data from cache memory 14, "Index_y" can be reused and associatively linked to key data corresponding to "req_entry_Q". Since the CAM 10 reported a miss for "req_entry_Q", Client 1 will initiate the memory fetch process to load the cache memory 14 with the corresponding key data from the host memory 18, and read the key data. Therefore, a subsequent search request for "req_entry_" by any client 12 will result in a miss.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of controlling access of at least two clients having corresponding integrity controllers to a cache memory and a content addressable memory (CAM) device, the method comprising:

detecting common lookup indices provided by the CAM device to the at least two clients in response to search requests issued by each of the at least two clients to the CAM device;

detecting a pending cache write memory operation initiated by one of the at least two clients having a corresponding first integrity controller in response to a corresponding search request; and, inhibiting a new cache memory operation for another of the at least two clients by a corresponding second integrity controller until the pending cache write memory operation is completed in response to the common lookup indices being detected.

2. The method according to claim 1, wherein detecting common lookup indices includes issuing a first search request of the search requests by a first client of the at least two clients.

3. The method according to claim 2, wherein detecting common lookup indices includes issuing a second search request of the search requests by a second client of the at least two clients, after the first search request is issued.

4. The method according to claim 3, wherein the CAM device provides a first lookup index in response to the first search request and a second lookup index in response to the second search request, the common indices including the first lookup index and the second lookup index having identical values.

5. The method according to claim 4, wherein detecting common lookup indices includes comparing the first lookup index to the second lookup index, and providing an index match output signal when the first lookup index to the second lookup index match.

6. The method according to claim 5, wherein inhibiting includes preventing generation of a grant signal in response to the index match output signal when the pending cache write memory operation is detected, the grant signal enabling execution of the new cache memory operation.

7. The method according to claim 3, wherein the new cache memory operation is a read operation when the CAM device response status is a hit condition in response to the second search request.

8. The method according to claim 7, wherein the first client reads data from the cache memory pointed to by the first lookup index, and the second client reads the data from the cache memory pointed to by the second lookup index.

9. The method according to claim 3, wherein the cache write memory operation is a first cache write memory operation, and the new cache memory operation is a second cache write operation when the CAM device response status is a miss condition in response to the second search request.

10. The method according to claim 9, wherein the first search request and the second search request are different.

11. The method according to claim 10, wherein the second lookup index has the same value as the first lookup index, when the first lookup index is tagged as being least recently used.

12. The method according to claim 11, wherein inhibiting includes enabling the second cache write operation when the first cache write memory operation is completed, the first cache write memory operation including reading data from the cache memory pointed to by the first lookup index.

13. The method according to claim 12, wherein the second cache write memory operation includes overwriting the data from the cache memory pointed to by the first lookup index with new data, and reading the new data from the cache memory pointed to by the second lookup index.

14. The method according to claim 2, wherein detecting a pending cache write memory operation includes initiating the pending cache write operation in response to a miss status of the first search request.

15. The method according to claim 14, wherein initiating the pending cache write operation includes setting a write status to an active logic state.

16. The method according to claim 15, wherein inhibiting includes preventing generation of a grant signal in response to the active logic state of the write status when the common lookup indices are detected, the grant signal enabling execution of the new cache memory operation.

17. The method according to claim 2, wherein the pending cache write memory operation includes transferring data from a memory to the cache memory.

18. A multi-client content addressable memory (CAM) system comprising:
   a content addressable memory (CAM) device providing one of a hit or a miss condition and lookup indices in response to search requests;
   a cache memory for storing data addressable by the lookup indices, the cache memory executing a cache write memory operation to write new data in response to the miss condition;
   at least two clients for issuing the search requests; and
   an access controller inhibiting a new cache memory operation corresponding to a second client of the at least two clients until a pending cache write memory operation corresponding to a first client of the at least two clients is completed, in response to common lookup indices received by both the first client and the second client, the access controller including at least two integrity controllers each corresponding to one of the at least two clients, one of the at least two integrity controllers associated with the second client for inhibiting execution of the new cache memory operation.

19. The multi-client CAM system according to claim 18, wherein each of the at least two integrity controllers includes inhibit circuitry for detecting the common lookup indices and an active write status of the cache memory, the inhibit circuitry preventing issuance of a grant signal enabling the new cache memory operation when the common lookup indices and the active write status are detected.

20. The multi-client CAM system according to claim 18, wherein the inhibit circuitry includes
   an index match circuit for comparing an assigned lookup index provided to a corresponding client of the at least two clients in response to a search request, against all other lookup indices provided to other clients of the at least two clients, the index match circuit providing an index match signal when the assigned lookup index matches at least one of the other lookup indices; and,
   a grant circuit for preventing issuance of the grant signal to the corresponding client in response to the received index match signal and the active write status.

21. The multi-client CAM system according to claim 20, wherein the grant circuit includes memory fetch logic for providing a fetch signal to initiate the new cache memory operation when the active write status is switched to an inactive write status, where the new cache memory operation includes a new cache write memory operation.

22. The multi-client CAM system according to claim 20, wherein the corresponding client initiates the new cache memory operation when the corresponding grant signal is released by the grant circuit, the new cache memory operation including a new cache write memory operation.

* * * * *